April 8, 1958 G. TRAUTVETTER Re. 24,455
TELEVISION CABINET
Original Filed June 7, 1954 2 Sheets-Sheet 1
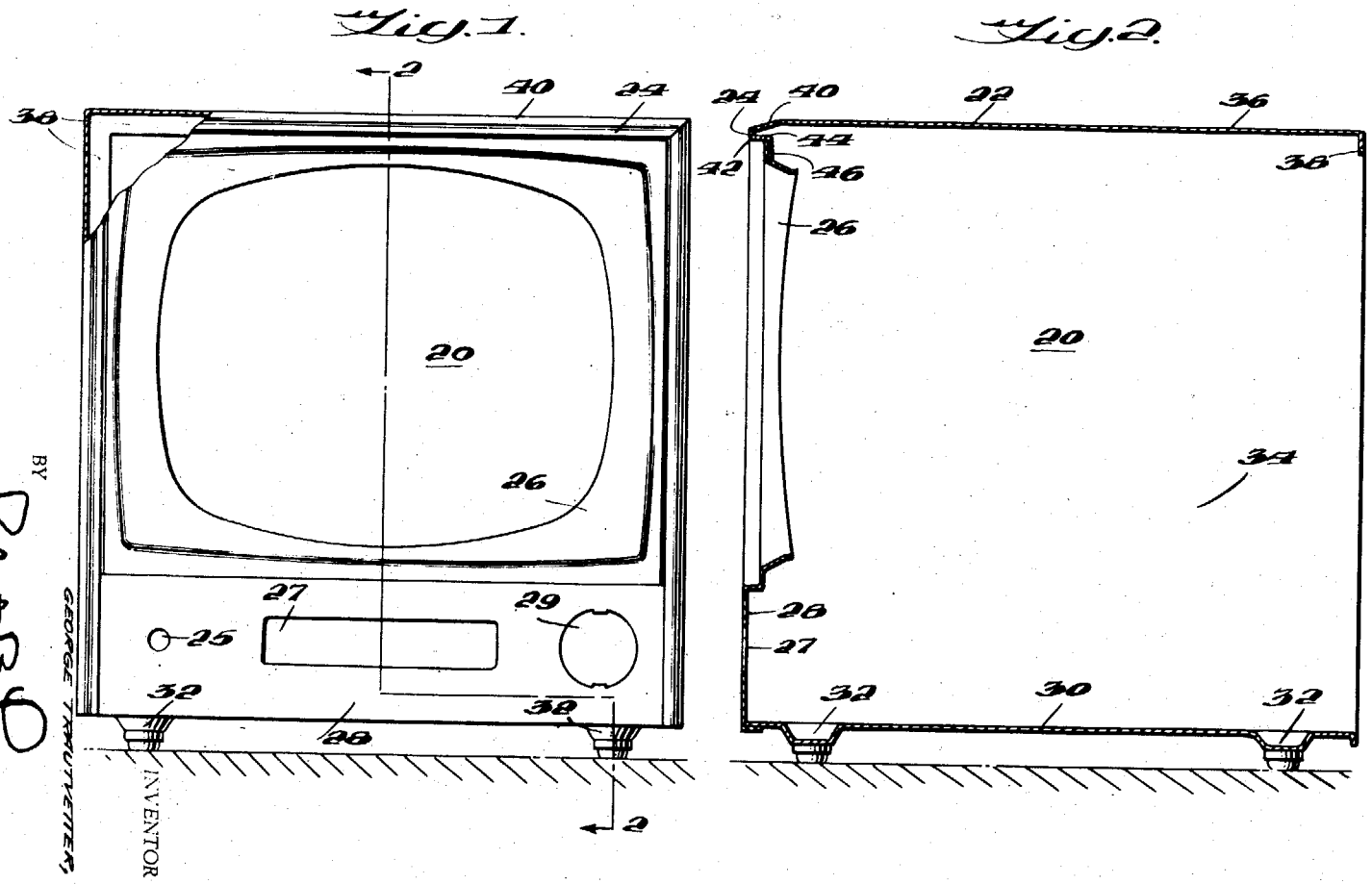
INVENTOR
GEORGE TRAUTVETTER,
BY Robert B. Pearson
ATTORNEY April 8, 1958 G. TRAUTVETTER Re. 24,455
TELEVISION CABINET
Original Filed June 7, 1954 2 Sheets-Sheet 2
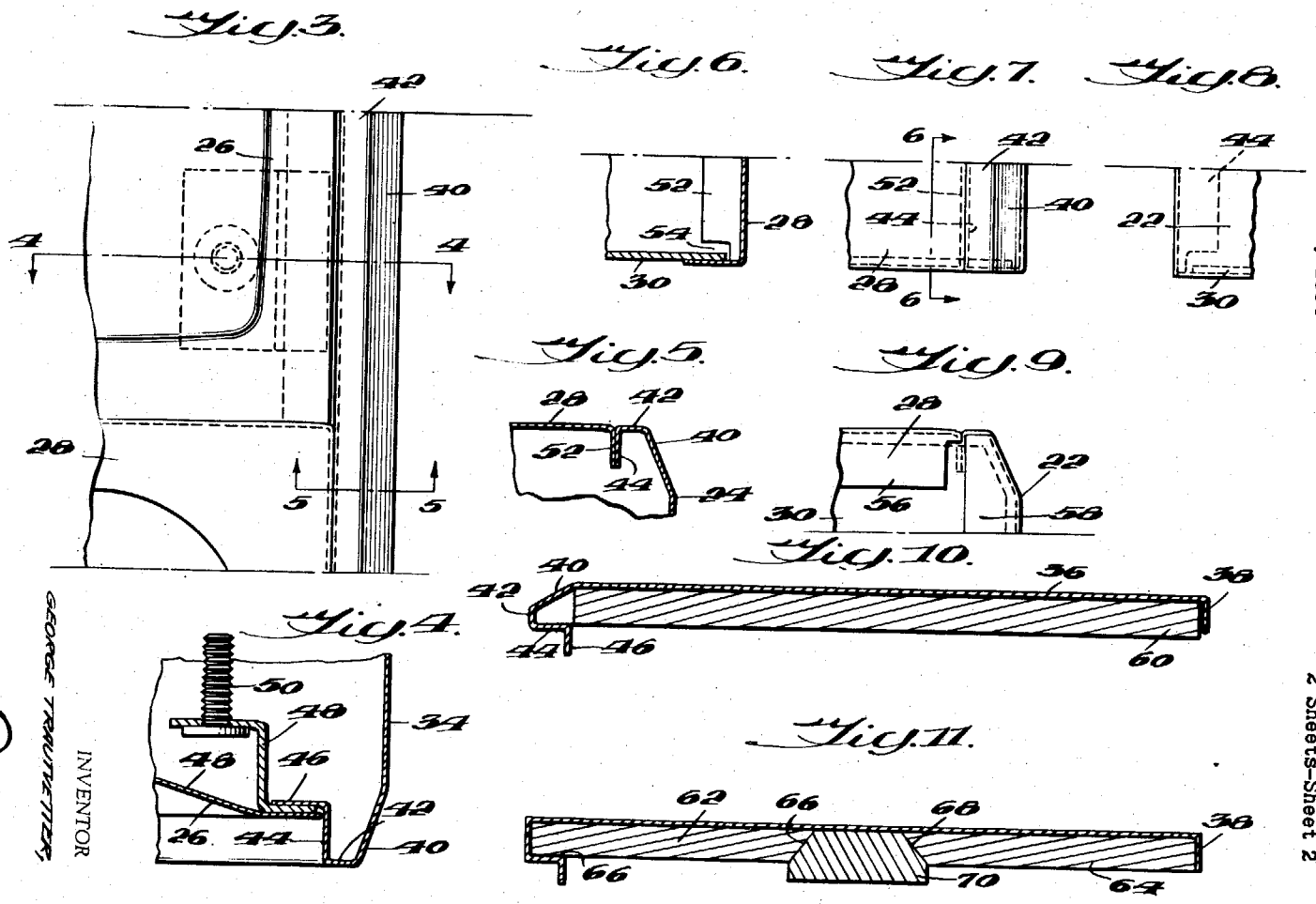
INVENTOR
GEORGE TRAUTVETTER,
BY Robert B. Pierson
ATTORNEY United States Patent Office Re. 24,455
Reissued Apr. 8, 1958

24,455

TELEVISION CABINET

George Trautvetter, Jenkintown, Pa., assignor, by mesne assignments, to Kelsey-Hayes Company, Detroit, Mich., a corporation of Delaware Original No. 2,783,113, dated February 26, 1957, Serial No. 434,755, June 7, 1954. Application for reissue June 4, 1957, Serial No. 670,848

3 Claims. (Cl. 312—7)

Matter enclosed in heavy brackets [ ] appears in the original patent but forms no part of this reissue specification; matter printed in italics indicates the additions made by reissue.

This invention relates to the construction of a television cabinet from sheet metal, and more particularly to the construction of the molding part of the metal television cabinet and its cooperation with the tube mask.

In the construction of known metal television cabinets, it is the usual practice to construct the main body of the wrap-around and the molding as separate pieces. One such recent construction is shown in copending application Serial No. 404,884 filed January 19, 1954, now Patent No. 2,695,206 granted November 23, 1954.

The construction of the molding separate from the wrap-around has a number of disadvantages. First, there must always be a joint between the wrap-around and the front molding, whether the molding is formed as a separate stamping or casting or whether it is formed of rolled metal sections as described in the copending application mentioned above.

The fact that the molding and wrap-around are two separate pieces has the obvious disadvantages of requiring a separate welding operation to join the members, as well as requiring a rather precise alignment.

Another disadvantage closely related to the matter of joining the two separate members is the desirability of having a uniform finish on the outer surface of the cabinet, which uniform finish cannot be readily accomplished where it is necessary to join two separate members together. For example, it is many times desired to finish the cabinet with a simulated wood grain. As a practical matter, it has been impossible to match the grains between the two sections and, therefore manufacturers have usually preferred a two-tone finish.

The invention realized that, if the wrap-around and front molding were stamped from a single piece of sheet metal, the disadvantages set forth above would be avoided, and, in addition, considerable savings could be effected by the elimination of separate stamping and welding operations, as well as separate stamping dies to make and join the cabinet in two separate pieces.

The inventor's new and improved wrap-around which includes the front molding in the single stamping eliminates the separate operations, permits a finish which quite closely approximates a wood grain finish, and is much cheaper to construct than the known designs.

In addition to the broad concept of constructing the front molding and wrap-around from one piece of sheet metal, the inventor has designed a bevel into the front molding, which bevel materially facilitates the stamping operation by enabling the stamping die to be removed easily after the operation.

Yet another feature of the applicant's invention is the construction of the television tube mask and control panel from a single piece of sheet metal which can be quite easily attached to the wrap-around and front molding.

Accordingly, it is an object of the present invention to provide a television cabinet in which the front molding and the wrap-around are stamped from a single sheet of metal.

[It is another object of the invention to provide a combination in which the major parts of the television cabinet consist of only two pieces, namely, the integral wrap-around and front molding and the integral tube mask and control panel.]

*It is a further object of this invention to construct an entire television cabinet from three members, an integral top and sidewall member, a front wall member, and a bottom member.*

These and other objects will become more readily apparent from a consideration of the following description of the invention taken in conjunction with the accompanying drawings, in which:

Fig. 1 is a front elevational view of a television cabinet constructed according to the present invention;

Fig. 2 is a sectional view taken along line 2—2 of Fig. 1;

Fig. 3 is a fragmentary detail view in front elevation;

Fig. 4 is a sectional view taken along lines 4—4 of Fig. 3;

Fig. 5 is a sectional view taken along lines 5—5 of Fig. 3;

Fig. 6 is a sectional view taken along lines 6—6 of Fig. 7;

Fig. 7 is a detail fragmentary view of the bottom corner of the cabinet in front elevation;

Fig. 8 is a fragmentary detail view of the corner of the cabinet shown in Fig. 7 looking toward the left;

Fig. 9 is a bottom plan view of the fragment shown in Fig. 7; and

Figs. 10 and 11 are diagrammatic sectional views illustrating the stamping operation.

The television cabinet 20 constructed according to the present invention is best shown in Figs. 1 and 2. The cabinet consists principally of the wrap-around 22, the molding 24, the tube mask 26, and the control panel 28. Additionally, the cabinet is provided with a bottom member 30 having feet 32 on which the cabinet is mounted.

The wrap-around 22 is comprised mainly of two side walls 34 and a top wall 36. These walls terminate at the rear end in flanges 38 to which a backing can be attached.

The front of the cabinet is terminated in the molding which consists of the bevelled surface 40, a short vertical surface 42, an inner surface 44 parallel to the walls of the wrap-around, and a flange 46 to which the tube mask and panel assembly are attached. All of the surfaces 40 through 46 are stamped integrally with the wrap-around 22.

The principal remaining member of the cabinet is the tube mask 26 and control panel 28, the control panel having openings 25, 27 and 29 for the control knobs. As best shown in Fig. 2, this member is stamped from a single piece of metal. Thus, the principal visible members of the television cabinet consist of only two pieces, the first being the integral wrap-around and front molding and the second being the integral tube mask and control panel. This arrangement obviously will effect savings in the assembling operations by reducing the number of members to be assembled.

The manner in which these two principal members are joined is shown in Figs. 4 and 5 which are sectional views along lines 4—4 and 5—5 respectively of Fig. 3.

In Fig. 4 it is shown that the mask portion 26 of the mask and control panel is welded to the flange 46 of the front molding portion of the wrap-around. Additionally, Fig. 4 shows a structural member 48 to which is mounted a bolt 50 for use in positively mounting the television chassis to the cabinet.

Fig. 5 shows that the lower part of the wrap-around adjacent the control panel 28 does not have the flange 46. Rather, the control panel 28 is welded directly to the inner surface 44 of the front molding.

Figs. 6 to 9 are detail views showing the construction of the bottom corner of the television cabinet and show in particular the manner of joining the bottom member 30 to the control panel 28 and wrap-around 22. At the bottom of the cabinet, the flange 52 on the control panel and the flange 44 on the wrap-around are slotted as indicated at 54 to accommodate the bottom member 30. The bottom member 30 rests on a flange 56 on the control panel 28 and a flange 58 on the wrap-around 22. The bottom member is welded to the wrap-around and control panel at the flanges 56 and 58.

*The major elements forming the entire television cabinet are seen to be an integral top and sidewall member, a front member which extends between the sidewalls and is connected therewith and a bottom wall which is connected with both the side walls and front member. Both the integral top and sidewall member and the front member are provided with flanges forming a tube masking area.*

In manufacturing the wrap-around and front molding integrally, a problem arises with respect to the removal of the stamping die after the wrap-around is completed. This problem is solved by this invention by introducing the bevel into the molding as shown in the drawings. Figs. 10 and 11 have been included in the application to show the importance of the bevel on the molding as it affects the stamping operation. In practice, the corners adjoining surfaces 42, 44 and 46 would be formed before the last stamping operation, so that, in the last operation, the wrap-around would be on a die, diagrammatically shown at 60 in Fig. 10, in order to form the corner between surface 40 and wall 36. Additionally, the flange 38 at the rear of the cabinet is formed simultaneously. After the stamping operation, the wrap-around must be removed from the die 60. With the bevel construction shown in Fig. 10, this can easily be effected as the die only extends to the bevel and, thus, permits removal of the stamping.

If, however, the bevel is not formed and the front molding is rectangular in section as shown in Fig. 11, it is necessary to provide a collapsible die in order to remove the stamping. Such a collapsible die might consist of a front member 62, a rear member 64, both bevelled as at 66 and 68 respectively, and a wedge 70. At the end of the stamping operation, the wedge can be removed to permit members 62 and 64 to be collapsed and the stamping removed.

Thus, it is demonstrated that, by adopting a bevel configuration on the front molding portion of the wrap-around, the operation of stamping the wrap-around is facilitated.

While I have described what I deem to be the most practical and efficient embodiments of my invention, it is to be well understood that I do not wish to be limited thereto as there are many variations which can be made without departing from the scope of the invention as set forth in the following claims.

I claim:

1. A television cabinet comprising, in combination, a pair of members, one of said members forming a top and side walls, the other of said members comprising an integral control panel and tube mask, said one member having reversely bent and inturned flanges along the sidewalls and top adjacent the tube mask portion and reversely bent flanges along the sidewalls adjacent the control panel portion, said other member having flanged portions along the top and side edges of the tube mask and 90° flanges on the edges of the control panel, said flanges on said members engaging to form the cabinet, said other member having reversely bent flanges along the side edges of the control panel and flanged portions along the side and top edges of the tube mask for engagement with the flanges on said first-named member.

2. A television cabinet according to claim 1 and further including inwardly bevelled portions along the top and side edges of said first-named member.

*3. A television cabinet comprising a substantially U-shaped first member forming a top and sidewalls, said first member having reversely bent and inturned flanges extending across the top and along portions of the sidewalls, said flanges adapted to receive a tube mask, a second member forming a bottom wall, said first member having inturned lower edges on the sidewalls, said inturned edges being disposed beneath said second member, and a third member forming a portion of the front of said cabinet, said third member having an inwardly extending flange along the bottom edge thereof, said last-named flange being secured to the bottom wall and means securing said third member to the first member.*

References Cited in the file of this patent or the original patent

UNITED STATES PATENTS

| | | |
|---|---|---|
| D. 170,292 | Trautvetter | Aug. 25, 1953 |
| 1,181,907 | Long | May 2, 1916 |
| 1,904,912 | Wolters | Apr. 18, 1933 |
| 2,169,419 | Hofferberth | Aug. 15, 1939 |
| 2,457,023 | Zelt | Dec. 21, 1948 |
| 2,543,146 | Bace | Feb. 27, 1951 |
| 2,552,617 | Bath | May 15, 1951 |
| 2,638,860 | Nobles | May 19, 1953 |
| 2,695,206 | Trautvetter | Nov. 23, 1954 |
| 2,769,679 | Wiseman | Nov. 6, 1956 |
| 2,783,114 | Raduns | Feb. 26, 1957 |

FOREIGN PATENTS

| | | |
|---|---|---|
| 648,396 | Germany | July 8, 1937 |